United States Patent
Vignard et al.

(10) Patent No.: US 11,364,899 B2
(45) Date of Patent: Jun. 21, 2022

(54) DRIVING ASSISTANCE METHOD AND SYSTEM

(71) Applicants: TOYOTA MOTOR EUROPE, Brussels (BE); INSTITUT NATIONAL de RECHERCHE en INFORMATIQUE et en AUTOMATIQUE (INRIA), Le Chesnay (FR); INSTITUT NATIONAL DES SCIENCES APPLIQUEES DE LYON, Villeurbanne (FR)

(72) Inventors: Nicolas Vignard, Brussels (BE); David Sierra Gonzalez, Gijon (ES); Christian Laugier, Montbonnot Saint-Martin (FR); Jilles Steeve Dibangoye, Villeubanne (FR); Victor Romero-Cano, Cali (CO)

(73) Assignees: TOYOTA MOTOR EUROPE, Brussels (BE); INSTITUT NATIONAL de RECHERCHE en INFORMATIQUE et en AUTOMATIQUE (INRIA), Cedex (FR); INSTITUT NATIONAL DES SCIENCES APPLQUEES DE LYON, Villeurbanne (FR)

( * ) Notice: Subject to any disclaimer, the term of this patent is extended or adjusted under 35 U.S.C. 154(b) by 154 days.

(21) Appl. No.: 16/617,941

(22) PCT Filed: Jun. 2, 2017

(86) PCT No.: PCT/IB2017/000856
§ 371 (c)(1),
(2) Date: Nov. 27, 2019

(87) PCT Pub. No.: WO2018/220418
PCT Pub. Date: Dec. 6, 2018

(65) Prior Publication Data
US 2020/0189574 A1    Jun. 18, 2020

(51) Int. Cl.
*B60W 30/09* (2012.01)
*G08G 1/16* (2006.01)
(Continued)

(52) U.S. Cl.
CPC ........ *B60W 30/09* (2013.01); *B60W 30/0953* (2013.01); *B60W 60/0015* (2020.02);
(Continued)

(58) Field of Classification Search
CPC ............. B60W 30/09; B60W 60/0015; B60W 60/00276; B60W 30/0953;
(Continued)

(56) References Cited

U.S. PATENT DOCUMENTS

2006/0041381 A1    2/2006  Simon et al.
2008/0084283 A1*   4/2008  Kalik ...................... B60Q 9/00
                                                      340/435
(Continued)

FOREIGN PATENT DOCUMENTS

EP    2 093 741 A1    8/2009
EP    2 289 754 A1    3/2011
(Continued)

OTHER PUBLICATIONS

Adrian Broadhurst, et al., "Monte Carlo Road Safety Reasoning", Intelligent Vehicles Symposium, Jun. 6, 2005, pp. 319-324.
(Continued)

*Primary Examiner* — Dale W Hilgendorf
*Assistant Examiner* — Hana Lee
(74) *Attorney, Agent, or Firm* — Sughrue Mion, PLLC

(57) ABSTRACT

A driving assistance system includes a sensor set, a data storage device and an output device. The sensor set observes
(Continued)

apparent states of each road user of the plurality of road users at successive time steps, the data processor assigns a behavioral model stored in the data storage device, the data processor calculating a new maneuver distribution that is a probability distribution over a finite plurality of alternative maneuvers and a new state distribution that is a probability distribution of possible states for each alternative maneuver of the finite plurality of alternative maneuvers. The data processor determines a risk of collision of the road vehicle with another road user, based on the new maneuver and state distributions of the target road user, and outputs one or more of a driver warning signal and executes an avoidance action if the risk of collision exceeds a predetermined threshold.

15 Claims, 4 Drawing Sheets

(51) Int. Cl.
  *G05B 13/02* (2006.01)
  *G05D 1/00* (2006.01)
  *B60W 30/095* (2012.01)
  *B60W 60/00* (2020.01)
(52) U.S. Cl.
  CPC ... *B60W 60/00276* (2020.02); *G05B 13/0265* (2013.01); *G05D 1/0088* (2013.01); *G08G 1/166* (2013.01); *B60W 2554/4049* (2020.02); *G05D 2201/0213* (2013.01)
(58) Field of Classification Search
  CPC ....... B60W 2554/4049; G05B 13/0265; G05D 1/0088; G05D 2201/0213; G05G 1/166
  See application file for complete search history.

(56) References Cited

U.S. PATENT DOCUMENTS

| | | | |
|---|---|---|---|
| 2008/0312830 A1 | 12/2008 | Liu et al. | |
| 2013/0179382 A1* | 7/2013 | Fritsch ................. | B60W 50/14 706/46 |
| 2014/0176714 A1* | 6/2014 | Li ......................... | G08G 1/166 348/148 |
| 2015/0210311 A1* | 7/2015 | Maurer ................... | B62D 6/00 701/41 |
| 2017/0031361 A1* | 2/2017 | Olson .................... | G08G 1/167 |
| 2017/0210379 A1* | 7/2017 | Obata ............... | B60W 30/0956 |
| 2017/0344855 A1* | 11/2017 | Mande ............... | G06K 9/00785 |
| 2018/0032891 A1* | 2/2018 | Ba ...................... | B60W 30/095 |

FOREIGN PATENT DOCUMENTS

| | | |
|---|---|---|
| EP | 2 806 413 A1 | 11/2014 |
| WO | 2018/078413 A1 | 5/2018 |

OTHER PUBLICATIONS

International Search Report for PCT/IB2017/000856 dated Mar. 21, 2018 [PCT/ISA/210].
Written Opinion for PCT/IB2017/000856 dated Mar. 21, 2018 [PCT/ISA/237].
Lefevre et al., "A survey on motion prediction and risk assessment for intelligent vehicles", Robomech Journal, vol. 1, pp. 1-14, 2014 (15 pages total).
Weiss et al., "Multiple-Model Tracking for the Detection of Lane Change Maneuvers", 2004 IEEE Intelligent Vehicles Symposium, pp. 937-942, Jun. 14-17, 2004 (6 pages total).
Kaempchen et al., "IMM Object Tracking for High Dynamic Driving Maneuvers", 2004 IEEE Intelligent Vehicles Symposium, pp. 825-830, Jun. 14-17, 2004 (6 pages total).
Toledo-Moreo et al., "IMM-Based Lane-Change Prediction in Highways With Low-Cost GPS/INS", IEEE Transactions on Intelligent Transportation Systems, vol. 10, No. 1, pp. 180-185, Mar. 2009 (6 pages total).
Tay Christopher, "Analysis of Dynamic Scenes: Application to Driving Assistance", Institut National Polytechnique de Grenoble—INPG, 2009 (183 pages total).
Aoude et al., "Probabilistically Safe Motion Planning to Avoid Dynamic Obstacles with Uncertain Motion Patterns", Autonomous Robots, vol. 35, No. 1, pp. 51-76, 2013 (26 pages total).
Gindele et al., "A Probabilistic Model for Estimating Driver Behaviors and Vehicle Trajectories in Traffic Environments", 2010 13th International IEEE Annual Conference on Intelligent Transportation Systems, pp. 1625-1631, Sep. 19-22, 2010 (7 pages total).
Agamennoni et al., "Estimation of Multivehicle Dynamics by Considering Contextual Information", IEEE Transactions on Robotics, vol. 28, No. 4, pp. 855-870, Aug. 2012 (16 pages total).
Barber, "Expectation Correction for Smoothed Inference in Switching Linear Dynamical Systems", Journal of Machine Learning Research, vol. 7, pp. 2515-2540, 2006 (26 pages total).
Bahram et al., "A Combined Model-and Learning-Based Framework for Interaction-Aware Maneuver Prediction", IEEE Transactions on Intelligent Transportation Systems, vol. 17, No. 6, pp. 1538-1550, Jun. 2016 (13 pages total).
Sierra Gonzalez et al., "High-Speed Highway Scene Prediction Based on Driver Models Learned From Demonstrations", Proceedings of the 2016 IEEE 19th International Conference on Intelligent Transportation Systems (ITSC 2016), Nov. 2016 (7 pages total).
Rummelhard et al., "Probabilistic Grid-based Collision Risk Prediction for Driving Application", International Symposium on Experimental Robotics, 2014, pp. 1-14 (15 pages total).
Lawitzky et al., "Interactive Scene Prediction for Automotive Applications", 2013 IEEE Intelligent Vehicles Symposium (IV), pp. 1028-1033, Jun. 23-26, 2013 (6 pages total).
Wolf et al., "Artificial Potential Functions for Highway Driving with Collision Avoidance", 2008 IEEE International Conference on Robotics and Automation, pp. 3731-3736, May 19-23, 2008 (6 pages total).
Ziebart et al., "Maximum Entropy Inverse Reinforcement Learning", Proceedings of the 23rd AAAI Conference on Artificial Intelligence, pp. 1433-1438, Jul. 13-17, 2008 (6 pages total).
Treiber et al., "Congested Traffic States in Empirical Observations and Microscopic Simulations", Phys. Rev. E., vol. 62, pp. 1805-1824, Aug. 2000 (47 pages total).
Rummelhard et al., "Conditional Monte Carlo Dense Occupancy Tracker", 18th IEEE International Conference on Intelligent Transportation Systems, pp. 2485-2490, Sep. 2015 (7 pages total).
Bar-Shalom et al., "Estimation with Applications To Tracking and Navigation: Theory Algorithms and Software", John Wiley & Sons, Inc., 2001, ISBNs: 0-471-41655-X (Hardback) 0-471-22127-9 (Electronic) (526 pages total).

* cited by examiner

DRIVING ASSISTANCE METHOD AND SYSTEM

CROSS REFERENCE TO RELATED APPLICATIONS

This application is a National Stage of International Application No. PCT/IB2017/000856 filed Jun. 2, 2017.

TECHNICAL FIELD

The disclosure relates to a driving assistance model and system for road vehicles, as well as to a road vehicle comprising such a driving assistance system. In this context, "driving assistance" should be understood broadly and not be limited to the support of an active human driver, but extend even to fully autonomous driving.

BACKGROUND

There has been a significant increase in research on Advanced Driver Assistance Systems (ADAS) in recent years. Especially in the sector of autonomous driving, that has become a critical concern around the world, because autonomous driving can increase safety and security of drivers, passengers, or pedestrians, enhance mobility for people and freight, or protect the environment. However, the available techniques used to predict the trajectories and intents of road users are time and memory demanding, which sets an obstacle to the development of safe and secure autonomous driving systems.

Planning-based approaches have been proposed which assume that rational actors, in their motion, seek to minimize a cost function which depends on their preferences and the context. Thus, given the cost function and the context, their future actions can be predicted. Such methods have been disclosed, for instance, by B. D. Ziebart, N. Ratliff, G. Gallagher, C. Mertz, K. Peterson, J. A. Bagnell, M. Hebert, A. K. Dey and S. Srinivasa, in "Planning-based prediction for pedestrians", Proceedings of the 2009 IEEE/RSJ International Conference on Intelligent Robots and Systems, ser. IROS'09, Piscataway, N.J., USA, 2009, pp. 3931-3936, by K. M. Kitani, B. D. Ziebart, J. A. Bagnell and M. Hebert, in "Activity Forecasting", Springer Berlin Heidelberg, 2012, pp. 201-214, and by D. Vasquez, in "Novel planning-based Algorithms for Human Motion Prediction", Proceedings of the IEEE Conference on Robotics and Automation, Stockholm, Sweden, May 2016. These disclosures focus on the problem of pedestrian motion prediction.

In this respect, in the specific field of road traffic, W. Schwarting and P. Pascheka, in "Recursive conflict resolution for cooperative motion planning in dynamic highway traffic", 2014 IEEE 17th International Conference on Intelligent Transportation Systems (ITSC), October 2014, pp. 1039-1044, have proposed a more refined approach which seeks the best cooperative behavior between two road users using hand-tuned cost functions in case of potential conflict between their trajectories as initially predicted without considering any interaction.

An alternative approach has been proposed by T. Gindele, S. Brechtel and R. Dillmann in "Learning driver behavior models from traffic observations for decision making and planning", IEEE Intelligent Transportation Systems Magazine, vol. 7, no. 1, pp. 69-79, 2015, in which each road user in a traffic scene is represented within a Dynamic Bayesian Network by a set of nodes representing its internal states and the relationships with the other road users and the road. Underlying policies are learned from data using random forests.

N. Lee and K. M. Kitani, in "Predicting wide receiver trajectories in American football", in 2016 IEEE Winter Conference on Applications of Computer Vision (WACV), March 2016, pp. 1-9, have proposed a planning-based approach in the completely different field of predicting trajectories of an attacking player in American football. This approach used a dynamic feature dependent on the motion of opposing players, which was predicted using supervised learning.

As discussed by S. Lefèvre, D. Vasquez, and C. Laugier, in "A survey on motion prediction and risk assessment for intelligent vehicles," ROBOMECH Journal, vol. 1, no. 1, pp. 1-14, 2014, approaches in behavior inference and motion prediction for intelligent vehicles are typically classified into three main groups: Physics-based, Maneuver-based, and Interaction-aware models.

Each of the following papers: K. Weiss, N. Kaempchen, and A. Kirchner, "Multiple-model tracking for the detection of lane change maneuvers," in IEEE Intelligent Vehicles Symposium, 2004, June 2004, pp. 937-942; N. Kaempchen, K. Weiss, M. Schaefer, and K. C. J. Dietmayer, "Imm object tracking for high dynamic driving maneuvers," in IEEE Intelligent Vehicles Symposium, 2004, June 2004, pp. 825-830; and R. Toledo-Moreo and M. A. Zamora-Izquierdo, "Imm-based lane-change prediction in highways with low-cost gps/ins," IEEE Transactions on Intelligent Transportation Systems, vol. 10, no. 1, pp. 180-185, March 2009, take a Physics-based approach where the future motion is predicted using dynamic or kinematic models, limiting their applicability to the immediate-term prediction.

Approaches based on the Interacting Multiple-Model filter (IMM) are included in this group. They rely on a bank of Kalman Filters to track the state of the target, yielding as a byproduct a distribution over the current dynamics of the target. The switching between dynamics is Markovian, causing the performance to depend heavily on a proper tuning of the regime transition matrix.

C. Tay, "Analysis of Dynamic Scenes: Application to Driving Assistance," Theses, Institut National Polytechnique de Grenoble—INPG, September 2009, takes a Maneuver-based approach where the future trajectory of the target is predicted by identifying the maneuver in execution from a finite set of maneuvers contained in a database. Methods used to identify the maneuver include Hidden Markov Models (HMM).

Whereas, G. Aoude, B. Luders, J. Joseph, N. Roy, and J. How, "Probabilistically safe motion planning to avoid dynamic obstacles with uncertain motion patterns," Autonomous Robots, vol. 35, no. 1, pp. 51-76, 2013, also takes a Maneuver-based approach where the future trajectory of the target is predicted by identifying the maneuver in execution from a finite set of maneuvers contained in a database, but the methods used to identify the maneuver include Gaussian Processes (GP).

T. Gindele, S. Brechtel, and R. Dillmann, "A probabilistic model for estimating driver behaviors and vehicle trajectories in traffic environments," in 13th International IEEE Conference on Intelligent Transportation Systems, September 2010, pp. 1625-1631, has shown that Dynamic Bayesian Networks (DBN) can explicitly formalize the interactions between traffic participants in the long-term prediction of traffic situations. This approach infers the behavior of each vehicle by identifying its current situation (e.g., close to the vehicle in front) as a function of its local situational context (e.g., distance to the vehicle in front).

G. Agamennoni, J. I. Nieto, and E. M. Nebot, "Estimation of multivehicle dynamics by considering contextual information," IEEE Transactions on Robotics, vol. 28, no. 4, pp. 855-870, August 2012, presented another approach following the same line of thought. In this approach, high-level discrete contexts determine the evolution of low-level dynamics. In contrast to the IMM approaches discussed above, the switching process is only conditionally Markov, also depending on the continuous state at the preceding time step through a linear feature-based function.

D. Barber, "Expectation correction for smoothed inference in switching linear dynamical systems," Journal of Machine Learning Research, vol. 7, pp. 2515-2540, 2006, discloses preforming approximate inference by using a variation of the forward pass for augmented Switching Linear Dynamical Systems (aSLDS).

In M. Bahram, C. Hubmann, A. Lawitzky, M. Aeberhard, and D. Wollherr, "A combined model- and learning-based framework for interaction-aware maneuver prediction," IEEE Transactions on Intelligent Transportation Systems, vol. 17, no. 6, pp. 1538-1550, June 2016, a cost-function that models the preferences and the risk-aversive behavior of drivers is used to estimate the interaction-aware motion intention of each vehicle in the scene. The model-based prediction is then complemented with a learning-based prediction to account for physical evidence of lane changes.

However, in D. Sierra Gonzalez, J. S. Dibangoye, and C. Laugier, "High-Speed Highway Scene Prediction Based on Driver Models Learned From Demonstrations," in Proceedings of the 2016 IEEE 19th International Conference on Intelligent Transportation Systems (ITSC 2016), Rio de Janeiro, Brazil, November 2016, and Patent No: PCT/IB2016/001737, the balance between the different driver model terms is learned automatically from demonstrations using Inverse Reinforcement Learning (IRL). A dynamic model learned from driving demonstrations is shown to produce human-like, interaction-aware, long-term predictions in highway scenarios.

Other disclosures relating to the field of predictive driving are: L. Rummelhard, A. Nègre, M. Perrollaz, and C. Laugier, in "Probabilistic Grid-based Collision Risk Prediction for Driving Application," in ISER, Marrakech/Essaouira, Morocco, June 2014;

A. Lawitzky, D. Althoff, C. F. Passenberg, G. Tanzmeister, D. Wollherr and M. Buss, in "Interactive scene prediction for automotive applications", 2013 IEEE Intelligent Vehicles Symposium (IV), Gold Coast City, Australia, Jun. 23-26, 2013, pp. 1028-1033;

M. T. Wolf and J. W. Burdick, "Artificial potential functions for highway driving with collision avoidance," in 2008 IEEE International Conference on Robotics and Automation, May 2008, pp. 3731-3736.

B. D. Ziebart, A. L. Maas, J. A. Bagnell, and A. K. Dey, "Maximum entropy inverse reinforcement learning," in Proceedings of the Twenty-Third AAAI Conference on Artificial Intelligence, AAAI 2008, Chicago, Ill., USA, Jul. 13-17, 2008, 2008, pp. 1433-1438;

M. Treiber, A. Hennecke, and D. Helbing, "Congested traffic states in empirical observations and microscopic simulations," Phys. Rev. E, vol. 62, pp. 1805-1824, August 2000;

L. Rummelhard, A. N'egre, and C. Laugier, "Conditional monte carlo dense occupancy tracker," in 2015 IEEE 18th International Conference on Intelligent Transportation Systems, September 2015, pp. 2485-2490; and Y. Bar-Shalom and X.-R. Li, Estimation with Applications to Tracking and Navigation. New York, N.Y., USA: John Wiley & Sons, Inc., 2001.

SUMMARY

A first object of the disclosure is that of proposing a driving assistance method which substantially increases the safety and security of a road vehicle by accurately predicting a future traffic scene, and taking appropriate action in response, using limited computational resources.

Accordingly, in at least one illustrative embodiment of a driving assistance method according to the present invention, the driving assistance method comprises the steps of observing, in a traffic scene including the road vehicle among a plurality of road users, apparent states of each road user of the plurality of road users at successive time steps; assigning a behavioral model to a target road user of the plurality of road users; calculating, for the target road user, at a new time step, based on the apparent states that have been observed, a new maneuver distribution that is a probability distribution over a finite plurality of alternative maneuvers, and a new state distribution that is a probability distribution over possible states for each alternative maneuver of the finite plurality of alternative maneuvers; a probability of a selected maneuver in the new maneuver distribution is calculated as proportional to the sum of the product, for each previous time step's maneuver that is a possible maneuver of the target road user in a previous time step, of a first term that is a previously calculated probability of the previous time step's maneuver, a second term that is a probability of the selected maneuver in the new time step from a probability distribution of possible states for the previous time step's maneuver based on the behavioral model assigned to the target road user, and a third term that is a probability of the apparent state observed at the new time step calculated for the selected maneuver and the probability distribution of possible states for the previous time step's maneuver based on a set of motion parameters associated to the selected maneuver; and the new distribution over possible states for each possible maneuver is calculated from a merger, for example a sum, over all previous time step's maneuvers, of the product, for each previous time step's maneuver, of at least a state distribution obtained by propagating the probability distribution of possible states for the previous time step's maneuver using the set of motion parameters associated to each alternative maneuver and a remixing term proportional to a product of the first, second, and third terms; determining a risk of collision of the road vehicle with another road user of the plurality of road users, based on the new maneuver and state distributions of the target road user; and outputting a driver warning signal and/or executing an avoidance action if the risk of collision exceeds a predetermined threshold.

By thus applying both a behavioral model assigned to the target road user and a set of motion parameters associated to each alternative maneuver of the target road user out of a finite plurality of alternative maneuvers, this method takes into account both the risk-averse behavior of the target road user and its dynamics to obtain a faster identification of new maneuvers and a greater ability to understand the traffic scene, which leads to fewer false maneuver detections, and thus to a more reliable driving assistance.

When the third term, that is, the probability of the apparent state being observed at the new time step for the selected maneuver and the probability distribution of possible states for the previous time step's maneuver, is calculated, this third term may be calculated by applying a set of motion parameters associated to the selected maneuver to the probability distribution over possible states for the previous time step's maneuver so as to obtain a dynamics-based predicted probability distribution for the new time step which is then compared with the apparent state observed at the new time step. Further, the set of motion parameters associated to the selected maneuver may be applied using at least a prediction step of an Extended Kalman Filter algorithm.

The dynamics of the target road user can thus accurately be taken into consideration by the driving assistance method in order to identify the maneuver being executed.

When the second term, that is, the probability of the selected maneuver in the new time step from a probability distribution of possible states for the previous time step's maneuver, is calculated, the behavioral model assigned to the target road user may take the form of a cost function for calculating a cost of a state of the target road user, with at least one dynamic component for taking into account a state of a road user other than the target road user, and the second term may be calculated by: sampling a plurality of possible states from the probability distribution among possible states of the target road user for the previous time step's maneuver; propagating each possible state sampled for the target road user, over a plurality of subsequent time steps, according to the set of motion parameters associated to each maneuver of the finite plurality of alternative maneuvers, to obtain an alternative sequence of prospective states at the plurality of subsequent time steps for each possible state sampled for each maneuver of the finite plurality of alternative maneuvers and the target road user; sampling at least one possible state and maneuver, from a state and a maneuver distribution of at least a road user, of the plurality of road users, other than the target road user, for the previous time step; propagating the at least one possible state sampled for the at least one road user other than the target road user, according to the set of motion parameters associated to the at least one maneuver sampled for the at least one road user other than the target road user, to obtain at least one sequence of prospective states at the plurality of subsequent time steps for the at least one road user other than the target road user; estimating a cost of each prospective state of each alternative sequence of prospective states of the target road user, according to the behavioral model assigned to the target road user, taking into account the at least one prospective state of the at least one road user other than the target road user at the same subsequent time step; aggregating the costs of the prospective states of each alternative subsequent sequence of prospective states of the target road user to obtain an aggregated cost for each alternative subsequent sequence of prospective states of the target road user; averaging the aggregated costs of the alternative sequence of prospective states of the target road user for each maneuver of the finite plurality of alternative maneuvers to obtain an average aggregated cost of each maneuver of the finite plurality of alternative maneuvers; and subtracting from one the ratio of the average aggregated cost of the selected maneuver to the sum of the average aggregated costs of the finite plurality of alternative maneuvers. The at least one dynamic component may in particular comprise a time-headway and/or a time-to-collision between the target road user and another road user of the plurality of road users. To assign a behavioral model to the target road user of the plurality of road users, an aggregated cost of successive observed states of the target road user may be calculated for each behavioral model of a finite plurality of alternative behavioral models, and the behavioral model with the lowest aggregated cost be selected.

By applying in this manner a behavioral model with a dynamic component for estimating a cost to the road user of taking each alternative maneuver, taking into account a state of at least another road user, a planning-based, risk-averse, human-like behavior of the target road user may thus accurately be taken into consideration in the driving assistance method.

In order to obtain a state distribution by propagating the probability distribution of possible states for each previous time step's maneuver when calculating the new distribution of possible states for each alternative maneuver, the set of motion parameters associated to each alternative maneuver may be applied using an Extended Kalman Filter algorithm, wherein the apparent state of the target road user at the new time step is used in an updating step. A more accurate reflection of the target road user's dynamics can thus be achieved.

In the driving assistance method mentioned above, the behavioral model assigned to the target road user may be selected from among a finite plurality of behavioral models. The finite plurality of behavioral models may be learned from observed road user behavior using a machine learning algorithm, and in particular an Inverse Reinforcement Learning algorithm.

In the driving assistance method described above, the traffic scene may comprise a multi-lane road, and the finite plurality of alternative maneuvers comprises a lane-keeping and a lane-changing maneuver.

The present disclosure also relates to a driving assistance system for a road vehicle. According to at least one embodiment, the driving assistance system may comprise a sensor set for observing a plurality of successive states for each road user of a plurality of road users in a traffic scene including the road vehicle among the plurality of road users; a data storage device for a database comprising a finite plurality of predetermined alternative maneuvers for the plurality of road users; a data processor, connected to the sensor set and the data storage device, for assigning a behavioral model to a target road user of the plurality of road users; calculating, for the target road user, at a new time step, based on the apparent states that have been observed, a new maneuver distribution that is a probability distribution over a finite plurality of alternative maneuvers, and a new state distribution that is a probability distribution of possible states for each maneuver of the plurality of alternative maneuvers, wherein: a probability of a selected maneuver in the new maneuver distribution is calculated as proportional to the sum of the product, for each previous time step's maneuver that is a possible maneuver of the target road user in the previous time step, of a first term that is a previously calculated probability of the previous time step's maneuver, a second term that is a probability of the selected maneuver in the new time step from a probability distribution of possible states for the previous time step's maneuver based on the behavioral model assigned to the road user, and a third term that is a probability of the apparent state observed at the new time step calculated for the selected maneuver and the probability distribution of possible states for the previous time step's maneuver based on a set of motion parameters associated to the selected maneuver; and the new distribution of possible states for each possible maneuver is calculated from a merger, for example a sum, over all previous time step's maneuvers, of the product, for each previous time step's maneuver, of a state distribution obtained by propagating the probability distribution of possible states for the previous time step's maneuver using the set of motion parameters associated to each alternative maneuver and a remixing term proportional to a product of the first, second and third terms; determining a risk of collision of the road vehicle with another road user of the plurality of road users, based on the new maneuver and state distributions of the target road user; and an output device, connected to the data processor, for outputting a driver warning signal and/or executing an avoidance action if the risk of collision exceeds a predetermined threshold.

The present disclosure also relates to a road vehicle comprising such a driving assistance system.

The above summary of some example embodiments is not intended to describe each disclosed embodiment or every implementation of the invention. In particular, selected features of any illustrative embodiment within this specification may be incorporated into an additional embodiment unless clearly stated to the contrary.

BRIEF DESCRIPTION OF THE DRAWINGS

The invention may be more completely understood in consideration of the following detailed description of an embodiment in connection with the accompanying drawings, in which.

Figure 1:
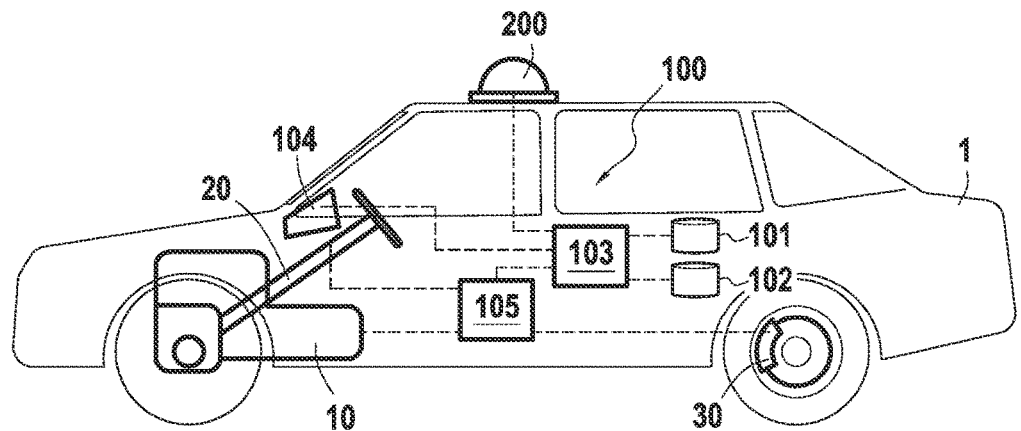
FIG. 1 is a schematic view of a road vehicle equipped with a driving assistance system according to an embodiment of the present invention.

While the invention is amenable to various modifications and alternative forms, specifics thereof have been shown by way of example in the drawings and will be described in detail. It should be understood, however, that the intention is not to limit aspects of the invention to the particular embodiment described. On the contrary, the intention is to cover all modifications, equivalents, and alternatives falling within the scope of the invention.

DETAILED DESCRIPTION

For the following defined terms, these definitions shall be applied, unless a different definition is given in the claims or elsewhere in this specification.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

FIG. 1 illustrates schematically a road vehicle 1 with a drivetrain 10, brakes 30, steering 20 and a driving assistance system 100 according to an embodiment of the invention. This driving assistance system 100 comprises a sensor set 200, a data storage device 102, a data processor 103, a warning signal output device 104 and a driving command output device 105. The data processor 103 is connected to the sensor set 101, to the data storage device 102, and to the warning signal and driving command output devices 104, 105. The driving command output device 105 is in turn connected to the drivetrain 10, brakes 30 and steering 20 of the road vehicle 1.

Figure 2:
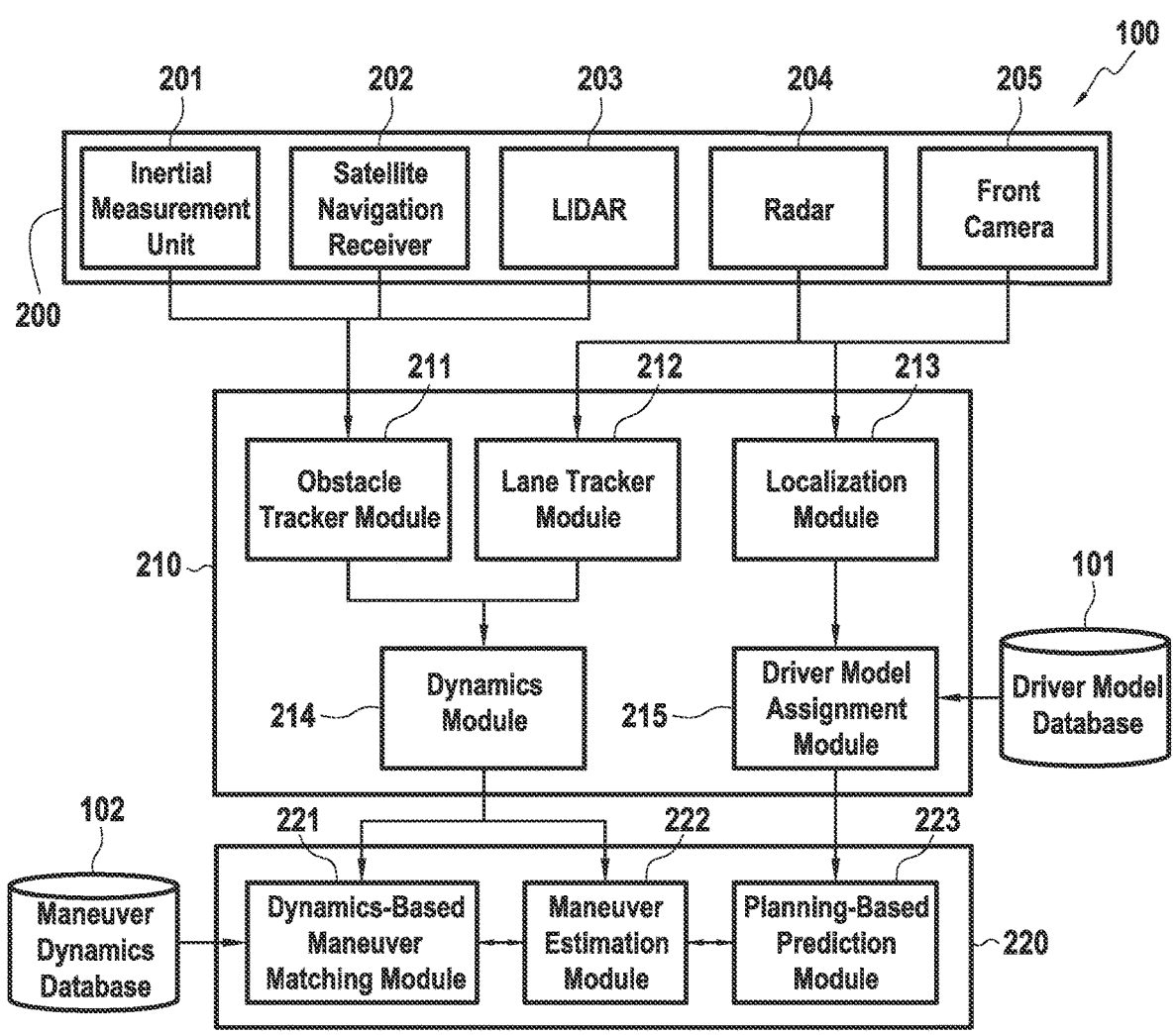
FIG. 2 is a functional diagram of the driving assistance system of FIG. 1.

FIG. 2 is a functional scheme of the driving assistance system 100. As illustrated in this figure, the sensor set 200 may comprise a variety of sensors, such as an inertial measurement unit 201, a satellite navigation receiver 202, a LIDAR 203, a radar 204, and a front camera 205. In the illustrated embodiment, the data processor 103 is adapted to process the raw incoming data from the sensor set 200 to identify and track obstacles, as well as to identify and track road lanes, and localize the road vehicle 1 on those road lanes and within a road network. This is illustrated in FIG. 2 by a first functional processing layer 210 in the data processor 103, including an obstacle tracker module 211, a lane tracker module 212, a localization module 213, an obstacle position and dynamics module 214, a driver model assignment module 215. The driver model assignment module is in communication with a driver model database 101.

The obstacle tracker module 211 processes the incoming data from the inertial measurement unit 201, satellite navigation receiver 202, LIDAR 203, and radar 204 in order to identify and track obstacles, in particular mobile obstacles such as other road users in a traffic scene within an area at least longitudinally centered on the road vehicle 1. This can be performed, for instance, using any one of the alternative algorithms disclosed by Anna Petrovskaya, Mathias Perrollaz, Luciano Oliveira, Luciano Spinello, Rudolph Triebel, Alexandros Makris, John-David Yoder, Christian Laugier, Urbano Nunes and Pierre Bessière in "Awareness of Road Scene Participants for Autonomous Driving" in Chapter "Fully Autonomous Driving" of "Handbook of Intelligent Vehicles", Vol. 2, Springer-Verlag London Ltd, 2012, edited by Azim Eskandarian.

On a multi-lane road within a road network, the lane tracker module 212 processes the incoming data from the front camera 205 in order to identify and track the lanes of the multi-lane road, whereas the localization module 213 processes the same incoming data to approximate the global localization of the road vehicle 1 in the road network.

The obstacle position and dynamics module 214 aggregates the output from the obstacle tracker module 211 and the lane tracker module 212.

The obstacle position and dynamics module 214 allocates an index i to each road user of a finite set V of N road users, including road vehicle 1, within the area centered on road vehicle 1, and identifies its apparent current position, heading and speed. Together, a tuple of apparent position, heading and speed may represent an apparent state $\vec{z}^i$ of each road user i.

A state and maneuver estimation framework may be applied based on a combination of discrete model-based maneuver prediction and discrete-continuous Bayesian filtering. More generally, the probabilistic model proposed can be categorized as a Switching State Space Model (SSSM), in which a high-level layer reasons about the maneuvers being performed by the interacting road users and determines the evolution of the low-level dynamics. More specifically, this SSSM can have three layers of abstraction:

The highest level corresponds to a maneuver $m_t^i$ being performed by each road user i at each time step t. This is a discrete hidden random variable.

The second level corresponds to the state $\vec{x}_t^i$ of each road user i at each time step t. This state is not directly observable.

The third level corresponds to the apparent state $\vec{z}^i$ of each road user i as observed at each time step t, which represents a noisy measurement of its actual state $\vec{x}_t^i$.

High-level reasoning can be performed through the fusion, by the state and maneuver estimation module 222, of an anticipatory, interaction aware, model-based prediction by the planning-based prediction module 223 and probabilistic messages based on the observed apparent states, and representing evidence about low-level dynamics as processed by the dynamics-based maneuver matching module 221.

A behavioral model database stored in the data storage device 101 in the present embodiment comprises a finite plurality of alternative dynamic behavioral models, each comprising a set of weight vectors corresponding to a specific driving behavior. So, for instance, the database may contain a safe driver model, corresponding to a road user with a preference for high time-headway and/or time-to-collision values; an aggressive driver model, corresponding to a road user with a high tolerance for low time-headway and/or time-to-collision values and a preference for the left-most lane in a multi-lane road; an exiting driver model, corresponding to a road user aiming to take an oncoming exit from the multi-lane road, and therefore giving preference to merging into the right-most lane over maintaining its preferred speed; and an incoming driver model, corresponding to a road user adapting its speed in order to merge into the road lanes.

A behavioral model assignment module 215 receives the output from the obstacle position and dynamics module 214 and the localization module 213 and assigns a behavioral model to a target road user in a current traffic scene. This behavioral model is selected from a finite plurality of behavioral models in a database stored in the data storage device 101. The assignment is based on a prior trajectory of the target road user. This prior trajectory comprises the successive apparent states of this road user perceived through the obstacle position and dynamics module 214 over a plurality of time steps, eventually up to the current state.

In order to select the behavioral model which best matches the prior trajectory of the road user from among the finite plurality of alternative behavioral models in the database 101, an aggregated cost of successively observed apparent states of that road user is calculated using a cost function associated to that behavioral model. Thereafter, the behavioral model with the lowest aggregated cost is selected. These behavioral models may be defined as dynamic cost functions.

To learn the feature-based cost function describing the preferences of a road user from driving demonstrations, a three-fold method may be used. First, the dynamics of the road user may be modeled as a Markov Decision Process (MDP). Second, a number of relevant features using background knowledge may be selected.

A Maximum Entropy IRL (Inverse Reinforcement Learning) algorithm may be used to learn the balance between the different terms of the cost function according to the behavior demonstrated. IRL algorithms aim to find a cost function corresponding to a behavioral model underlying a set of observed apparent trajectories.

The goal of an IRL algorithm is to find the weight vectors of the cost function for which the optimal policy obtained by solving the underlying planning problem would result in trajectories sufficiently similar to the observed trajectories according to a given statistic.

IRL algorithms have been considered as a possible viable approach for learning cost functions describing driving behaviors. The cost function that results from the three-fold method discussed above is linear on the features:

$$\text{Cost}(\vec{x}) = \vec{\theta} \cdot \vec{f}(\vec{x})$$

where $\vec{\theta} = (\theta_1, \ldots, \theta_K)$ is the weight vector and $\vec{f}(s) = (\vec{f}_1(\vec{x}), \ldots, \vec{f}_K(\vec{x}))$ is the feature vector that parameterizes state $\vec{x}$.

In order for the model to capture the preferences and the risk-aversive behavior of a road user, the following features are considered: lane; speed deviation; and time-headway.

a) Lane: aims to capture the preference of a road user to drive on a particular lane.

b) Speed deviation: encodes the penalty of deviating from the road user's desired speed, which is set to the maximum speed reached by the road user since the last change in the legal speed limit.

c) Time-headway: defines the time elapsed between the back of a lead road user passing a point and the front of a following road user passing the same point. It indicates potentially dangerous situations.

Two separate features associated to the time-headway may be considered: a time-headway to a closest road user in front in the current lane and the time-headway to a closest trailing road user in the current lane. With continued reference to FIG. 2, the data processor 103 is adapted to further process the output data from the first functional processing layer 210 in order to predict a future traffic scene. This is illustrated on FIG. 2 by an estimation layer 220 in the data processor 103, including a dynamics-based maneuver matching module 221, a state and maneuver estimation module 222, and a planning-based prediction module 223.

A maneuver dynamics database is stored in the data storage device 102 in the present embodiment and comprises a finite plurality of predetermined motion parameter sets, each associated to an alternative maneuver. For example, the database may contain a lane change motion parameter set, corresponding to a road user changing lanes; and a lane keeping motion parameter set, corresponding to a road user staying in the same lane. However, it is envisioned that several other possible maneuvers may be contained in the database.

The dynamics-based maneuver matching module 221 receives the output from the obstacle position and dynamics module 214 and applies the motion parameter sets stored in the maneuver dynamics database 102 to produce a dynamics-based maneuver estimation for a target road user. This process may be performed using the predictive step of an Extended Kalman Filter algorithm and results in a new temporary state distribution at t+1, which can then be compared (or "matched") with the apparent states observed to predict the likelihood of each maneuver.

When determining a state for maneuver dynamics, it is assumed that road users move on a 2D environment and that the configuration of a road user i in a curved road frame is given by the state vector $\vec{x}_t^i = [x, y, \psi, v, \omega]^T \in \mathbb{R}^5$, where x and y are the coordinates of target road user i, v is the target road user's absolute linear speed along its direction of travel $\psi$ and $\omega$ is a yaw rate. All variables in the state vector except for the yaw rate are observed.

The values for the state vector are found using the following differential equations, $$\dot{x}(t) = v(t)\cos\psi(t)$$

$$\dot{y}(t) = v(t)\sin\psi(t)$$

$$\dot{\psi}(t) = \omega(t)$$

$$\dot{v}(t) = a_{idm}$$

$$\dot{\omega}(t) = 0$$

where $\dot{v}(t)$ is equal to the longitudinal acceleration of the road user i, which is set using an Intelligent Driver Model (IDM). Hence, the acceleration of the target road user is calculated at each time step as a function of the states of all the road users in the traffic scene.

A maneuver-dependent predictive function $g_\lambda$ integrates the set of differential equations above over an interval of time $\Delta t$ to obtain the next state of the target road user. The motion is assumed to be perturbed by Gaussian noise to account for the maneuver specific modeling errors.

In essence, the motion is dependent not only on the maneuver being performed by the target road user, but on the states of the other road users. For example, a lane keeping maneuver involves adjusting the acceleration of the target road user depending on the state of the preceding traffic.

Although several different types of maneuvers are contemplated, for illustrative purposes, the exemplary set of maneuvers discussed will be lane changing and lane keeping.

1) Lane change (LC): The target road user turns and moves towards a neighboring lane. The dynamics of this maneuver are perfectly specified with the differential equations mentioned above and its process noise covariance matrix $Q_{LC}$.

2) Lane keeping (LK): The target road user remains on its lane, aligned with the direction of the road, and driving at its desired speed unless it is slowed down by a leading road user. However, this maneuver does not adopt the constant yaw assumption of other approaches.

A constant yaw assumption does not suffice to distinguish the LK and LC dynamics. Therefore, the lane keeping motion model using the differential equation set mentioned above and a corresponding process noise covariance matrix $Q_{LK}$ is parameterized with an artificial observation $\omega'$ for the yaw rate:

$$\omega' = -\omega_{max}\left(\frac{\psi(t)}{\psi_{max}}\right)$$

In essence, the artificial observation accounts for a circumstance when a target road user is performing a lane keeping maneuver and has a high yaw (it is not aligned with the road) and a steering action is expected in order to re-align the target road user with the road. The magnitude of the expected yaw rate will be proportional to the misalignment of the given road user with the road, and is parametrized by $\psi_{max}$ and $\omega_{max}$, which have been obtained experimentally.

Figure 3:
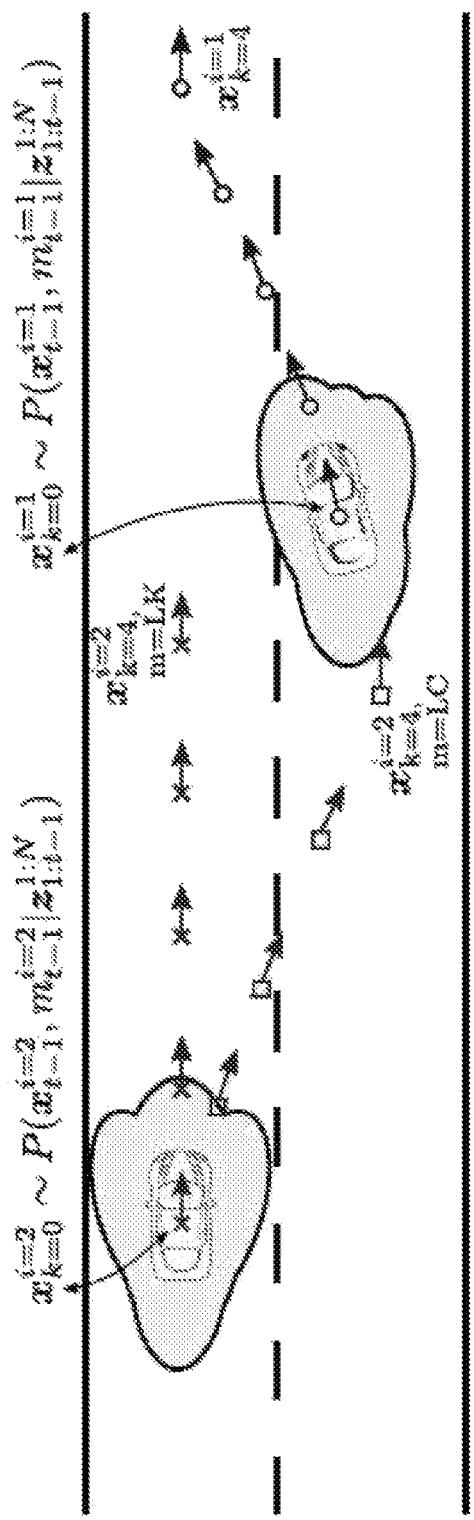
FIG. 3 is a schematic diagram illustrating how sampled states of a target road user and another road user are propagated over several subsequent time steps, using motion parameters associated to different sampled maneuvers, in a driving assistance method according to an embodiment of the present invention.

With reference to FIGS. 2 and 3, the planning-based prediction module 223 also provided in the functional processing layer 210 uses the risk-aversive behavior model obtained with IRL to forecast the probability of each target road user's next maneuver in response to the states and maneuvers of the other road users.

This behavior model balances the (navigational and risk) preferences of road users and enables a planning based prediction of their anticipatory behavior. A target road user will perform a maneuver at the current time step if, given his prediction for the behavior of the surrounding road users, this leads to a sequence of F future states that agree with its own preferences, which are encoded in its behavior model:

$$P(m_{t+1}^i = M \mid \vec{x}_t^{1:N}, m_t^{1:N}) \propto$$

$$\mathbb{E}_{(\vec{x}_t^{1:N}, m_t^{-i}) \sim P(\vec{x}_t^{1:N}, m_t^{1:N} \mid z_{1:t}^{1:N})} \left[1 - \frac{\sum_{k=0}^{F} \theta^T f(\vec{x}_{t+k,M}^i)}{\sum_{M'} \sum_{k=0}^{F} \theta^T f(\vec{x}_{t+k,M'}^i)}\right]$$

the notation for the state may be overloaded to explicitly indicate the maneuver being used to propagate it between time steps, and the notation $m^{-i}$ indicates the maneuvers for all road users except the target road user i. The expectation $\mathbb{E}$ is taken with respect to the posterior at the previous time step t, which factorizes across road users.

The calculation starts from the probability distributions over states and maneuvers for all of the road users at a previous time step t. In order to calculate the cost map for a target road user in future time steps, the future states of the other road users are obtained by sampling a state and a maneuver from the current probability distribution over states and maneuvers for each other road user, and propagating forward the sampled state F time steps according to the corresponding sampled maneuver.

In contrast, a plurality of states and maneuvers are sampled from the state and maneuver distribution of the target road user at the previous time step t. Then, each one of these samples states is propagated according to the corresponding maneuver so as to obtain sequences of future F states resulting from following each sampled maneuver from each sampled state of the target road user. Following that, the cost for each future state of each sequence of future F states of the target road user propagated from a sampled state with a sampled maneuver is calculated and aggregated. Maneuvers for which the aggregated cost is very high in comparison to other alternative maneuvers will be assigned a low expected probability. Since the calculations use multiple samples from the distribution over maneuvers and states of the target road user, this procedure is repeated a sufficiently large number of times. To illustrate this, FIG. 3 shows two road users on a highway. A target road user is shown as driving behind another road user or second road user. The target road user has two alternative maneuvers. One is a lane keeping (LK) maneuver and the other is a lane changing (LC) maneuver. The series of arrows indicating that target road user performing an LK maneuver are the subsequent sequence of states that the target road user may have. The series of arrows indicating that target road user performing an LC maneuver are the subsequent sequence of states that the target road user may have. Finally, the series of arrows indicating that second road user is performing an LC maneuver are the subsequent sequence of states that the other road user may have.

Applying this concept to the scenario shown in FIG. 3, a lane change maneuver is propagated by setting a predefined angular speed $\omega_{LC}$ until the yaw reaches a given threshold. The lane keeping maneuver fixes the relative lateral position of the target road user and propagates it only longitudinally. When the maneuver being performed is a lane change and the vehicle reaches the centerline of the neighboring lane, the maneuver is switched automatically to lane keeping.

The result is a risk-aversive predictive distribution over maneuvers for the target road user. This prediction takes into account the interactions between road users and the preferences of the target road user.

For example, a vehicle that is slowed down behind a truck on the highway may consider whether to keep driving behind the truck or to overtake. Using the features presented in above, if the driver keeps driving behind the truck he will be penalized, or endure a cost, for deviating from his desired speed. In contrast, a lane change will mean a small penalty or cost for not driving in the right-most lane but will enable the driver to accelerate, minimizing thus the cost due to speed.

The final component in the prediction and estimation layer 220 is a target state and maneuver estimation module 222. This module merges the information from maneuver model assignment module 221 with the PBM 223 and inputs the information from the obstacle position and dynamics module 214 to output an approximate inference about the risk of collision with another road user. The merging of all of this information provides faster maneuver detections and suppresses the number of false detections.

Exact inference of the state and maneuver distribution $P(\vec{x}_t^i, m_t^i | \vec{z}_{1:t}^i)$ is intractable in both the standard SLDS and in the aSLDS, scaling exponentially with time. The proposed approximate inference engine is similar to the filtering approach presented by Barber in "Expectation correction for smoothed inference in switching linear dynamical systems", with an extension to account for non-linear dynamics. Such an engine was already used by Agamennoni et al. in "Estimation of multivehicle dynamics by considering contextual information", although with a non-Gaussian emission model. Here, such approximate inference may be performed individually per road user, which makes the algorithm highly parallelizable. The intractable state and maneuver distribution $P(\vec{x}_t^i, m_t^i | \vec{z}_{1:t}^i)$ may be approximated with a simpler distribution, such as a mixture of Gaussian probability distributions, and a recursion be established to track it over time. The state and maneuver distribution $P(\vec{x}_t^i, m_t^i | \vec{z}_{1:t}^i)$ can be decomposed as:

$$P(\vec{x}_t^i, m_t^i | \vec{z}_{1:t}^i) = P(\vec{x}_t^i | m_t^i, \vec{z}_{1:t}^i) P(m_t^i | \vec{z}_{1:t}^i)$$

where $P(m_t^i | \vec{z}_{1:t}^i)$ is the marginal probability of each maneuver $m_t^i$ and $P(\vec{x}_t^i | m_t^i, \vec{z}_{1:t}^i)$ is the state probability distribution for each alternative maneuver $m_t^i$. A recursion can be established for each of these terms. The state probability distribution for each alternative maneuver $P(\vec{x}_t^i | m_t^i, \vec{z}_{1:t}^i)$ may be approximated with a Gaussian mixture distribution with C components, such as:

$$P(\vec{x}_t^i | m_t^i, \vec{z}_{1:t}^i) \approx \sum_{c_t=1}^{C} P(\vec{x}_t^i | c_t, m_t^i, \vec{z}_{1:t}^i) P(c_t | m_t^i, \vec{z}_{1:t}^i)$$

where the term $P(\vec{x}_t^i | c_t, m_t^i, \vec{z}_{1:t}^i)$ is a Gaussian distribution with mean $f(c_t, m_t^i)$ and covariance $F(c_t, m_t^i)$, and the term $P(c_t | m_t^i, \vec{z}_{1:t}^i)$ indicates the weight of the mixture component. It must be noted that the Gaussian mixture distribution may even have a single component (C=1), and thus be a simple Gaussian distribution.

The recursion for the state probability distribution for each alternative maneuver at the next time step t+1 can then be established as:

$$P(\vec{x}_{t+1}^i | m_{t+1}^i, \vec{z}_{1:t+1}^i) = \sum_{m_t^i, c_t} P(\vec{x}_{t+1}^i, m_t^i, c_t | m_{t+1}^i, \vec{z}_{1:t+1}^i)$$

$$= \sum_{m_t^i, c_t} P(\vec{x}_{t+1}^i | c_t, m_{t:t+1}^i, \vec{z}_{1:t+1}^i)$$

$$P(m_t^i, c_t | m_{t+1}^i, \vec{z}_{1:t+1}^i)$$

The term $P(\vec{x}_{t+1}^i | c_t, m_{t:t+1}^i, \vec{z}_{1:t+1}^i)$ can be obtained by propagating forward with the motion parameters associated with all alternative maneuvers $m_{t+1}^i$ each component of the Gaussian mixture composing $P(\vec{x}_t^i | m_t^i, \vec{z}_{1:t}^i)$, in a prediction step, and conditioning on the newly observed apparent state $\vec{z}_{t+1}^i$, in an update step. This leads to an exponential increase in the number of Gaussian components that may however be collapsed back to C components per maneuver in a subsequent merging step. The prediction and update steps may be performed using an Extended Kalman Filter (EKF) algorithm. Hence, the non-linear predictive function $g_\lambda$ may be associated to the motion parameters of the maneuver $m_{t+1}^i$.

To obtain the weights of the new mixture components, the following may be considered:

$$P(m_t^i, c_t | m_{t+1}^i, \vec{z}_{1:t+1}^i) \propto P(\vec{z}_{t+1}^i | c_t, m_{t:t+1}^i, \vec{z}_{1:t}^i) P(m_{t+1}^i | c_t, m_t^i, \vec{z}_{1:t}^i) P(c_t | m_t^i, \vec{z}_{1:t}^i) P(m_t^i | \vec{z}_{1:t}^i)$$

The terms $P(c_t | m_t^i, \vec{z}_{1:t}^i)$ and $P(m_t^i | \vec{z}_{1:t}^i)$ are available from the previous step in the recursion; the term $P(\vec{z}_{t+1}^i | c_t, m_{t:t+1}^i, \vec{z}_{1:t}^i)$ is the likelihood of observing the apparent state $\vec{z}_{t+1}^i$ according to the Gaussian distribution, provided by the dynamics-based maneuver matching module 221 by applying the abovementioned prediction step of the Extended Kalman Filter algorithm to each Gaussian component $c_t$ for each previous time step's maneuver $m_t^i$ using the motion parameters associated to each alternative maneuver $m_{t+1}^i$, and the term $P(m_{t+1}^i | c_t, m_t^i, \vec{z}_{1:t}^i)$, that is, the probability of each maneuver $m_{t+1}^i$ in the new time step from each Gaussian component $c_t$ for each previous time step's maneuver $m_t^i$, is provided by the planning-based prediction module 223. This is thus where the fusion between dynamics- and planning-based estimates takes place.

Coming back to the equation for the state and maneuver distribution, the recursion for the marginal probability of each maneuver $m_{t+1}^i$ at the new time step t+1 can be established as:

$$P(m_{t+1}^i \mid \vec{z}_{1:t+1}^i) \propto \sum_{c_t, m_t^i} P(c_t, m_t^i, m_{t+1}^i, \vec{z}_{1:t+1}^i)$$

which can be calculated from the same components as $P(m_t^i, c_t \mid m_{t+1}^i, \vec{z}_{1:t+1}^i)$ above. Finally, at each step of this inference procedure, the number of Gaussian mixture components increases from |m|C to |m|²C, each with a weight $P(m_t^i, c_t \mid m_{t+1}^i, \vec{z}_{1:t+1}^i)$. The |m|C components associated to each maneuver $m_{t+1}^i$ may however be collapsed back to C components using a single procedure, for instance by retaining the |C−1| components with the largest mixture weights and merging the remaining to a single Gaussian distribution.

In essence, the target state and maneuver estimation module 222, by fusing the risk-aversive predictive maneuver distribution provided by the planning-based prediction module 223 with the dynamics-based maneuver estimation provided by the dynamics-based maneuver matching module 221 delays the detection of maneuvers that do not agree with the prediction based on the risk-averse behavior model assigned to the target road user, leading thus to a reduction in the number of false maneuver detections, while accelerating on the other hand a maneuver detection from observed data if it matches the expected behavior of the road user.

Figure 4A:
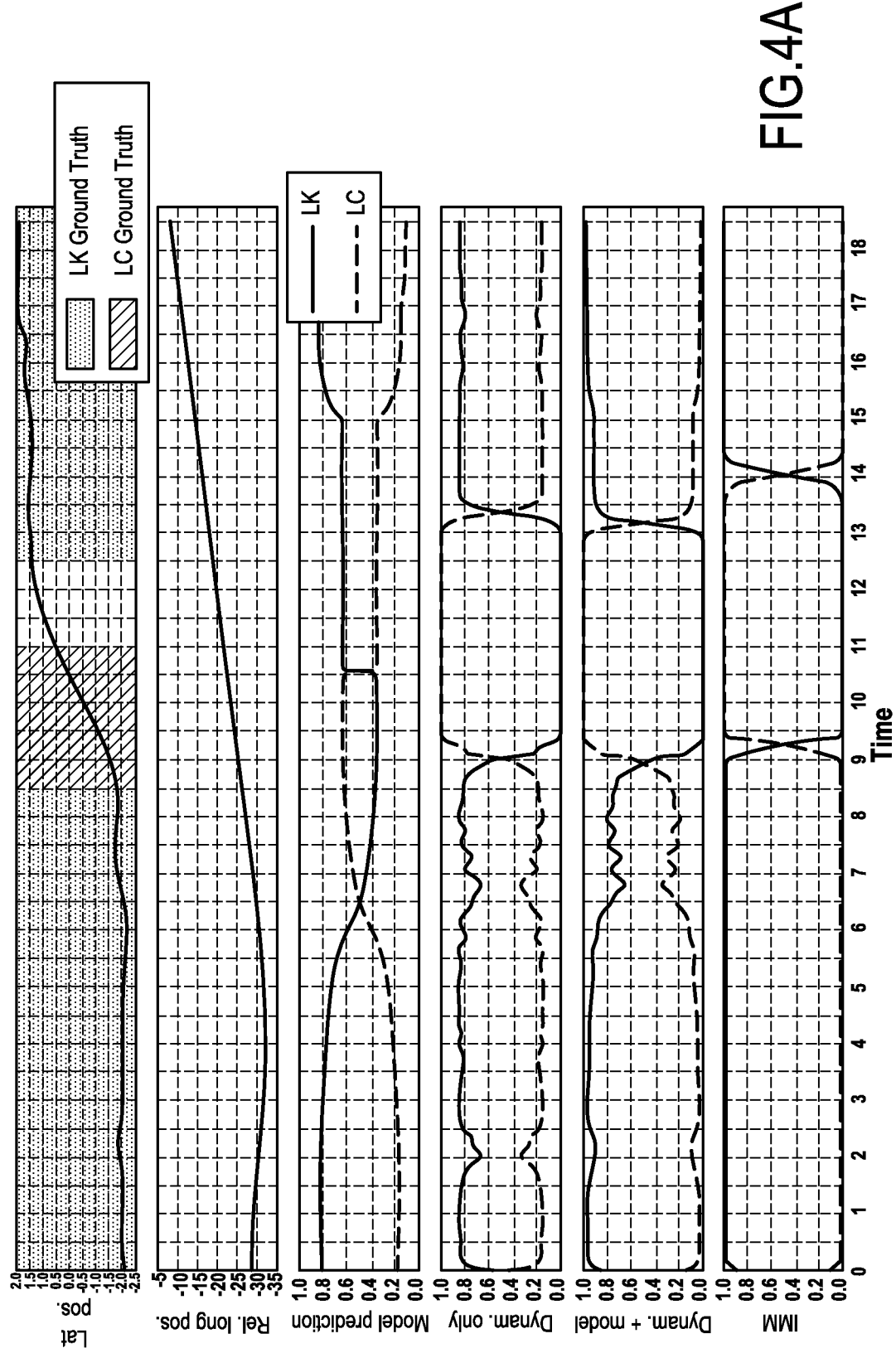
FIGS. 4A and 4B illustrate maneuver filtering results obtained for a rear cut-out lane change and a forward cut-in lane change.
Figure 4B:
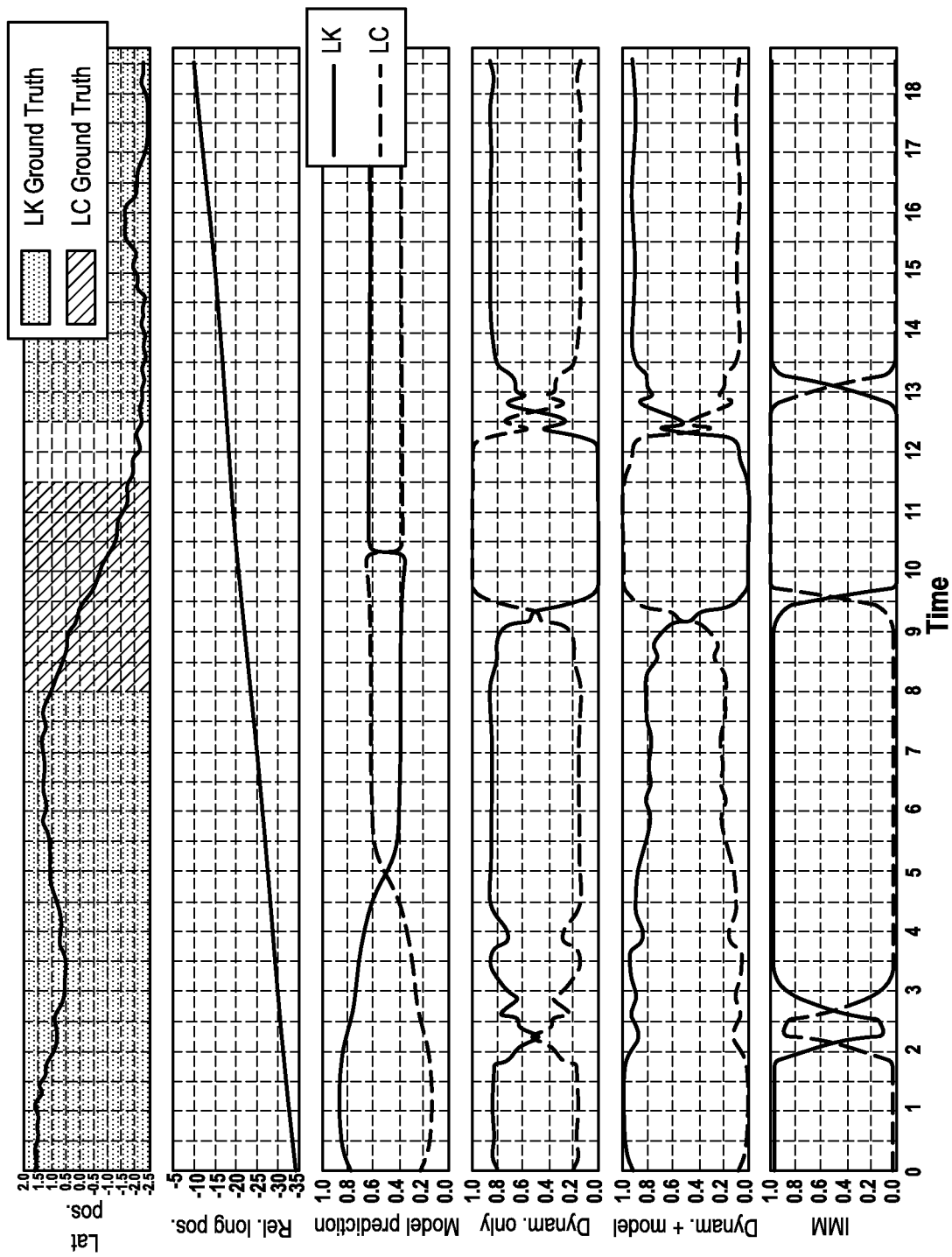

Turning to FIGS. 4A and 4B showing the results obtained for two exemplary scenes, with only two alternative maneuvers: lane keeping and lane changing. In the first scene, FIG. 5A, the target road user drives behind another road user until the left lane is free of traffic and then performs a lane change to overtake. The first row in shows the lateral position of the target road user in road coordinates (the center lane-marking corresponds to y=0); the second row shows the relative longitudinal position of the target road user with respect to the other road user. As can be seen in the third row, a purely planning-based prediction initially concedes a low probability to the lane changing maneuver due to the presence of traffic in the neighboring lane. Once the left lane becomes free, the probability for a lane change begins to grow as the distance with the preceding traffic increases. The increase in the probability of a lane change maneuver is due to the cost penalty induced by driving behind the other road user at a speed lower than the target road user's desired speed, which had been set earlier during the target road user's approach.

A purely dynamics-based maneuver filtering estimate is shown in the fourth row. The lane change maneuver is detected only 0:51 s after it begins and roughly 1:5 s before the target crosses the lane marking. This is 0:2 s faster than an IMM-based estimate, which is shown in the last row. A maneuver estimate according to an embodiment of the invention, merging thus the planning-based and dynamics-based approaches, is shown in the fifth row. As it can be seen, the effect of the planning-based prediction in the lane changing maneuver estimate is a slightly quicker detection both of the beginning and of the end of the maneuver.

FIG. 5B shows the filtering results for a different scene, in which the target road user overtakes the other road user and then merges back to the right lane. It can be seen in the figure that integrating the planning-based prediction into the dynamics-based filtering framework results in a quicker detection of the start and the end of the lane changing maneuver. An additional effect is shown in this figure. The slight oscillations in the lateral position typical of a human-driven vehicle following a highway lane can be observed at approximately t=3:5 s. As a consequence of this lateral movement, both the purely dynamics-based and the IMM lane change estimate produce a false positive. This does not occur in the final estimate according to the illustrated embodiment of the present invention, since the planning-based prediction assigns a very low probability to a lane change maneuver around t=3, moment in which the target road user drives right next to the other road user.

Those skilled in the art will recognize that the present invention may be manifested in a variety of forms other than the specific embodiment described and contemplated herein. Accordingly, departure in form and detail may be made without departing from the scope of the present invention as described in the appended claims.

The invention claimed is:

1. A driving assistance method for a road vehicle, the driving assistance method comprising the steps of:
    observing, in a traffic scene including the road vehicle among a plurality of road users, apparent states of each road user of the plurality of road users at successive time steps;
    assigning a behavioral model to a target road user of the plurality of road users;
    calculating, for the target road user, at a new time step, based on the apparent states that have been observed, a new maneuver distribution that is a probability distribution over a finite plurality of alternative maneuvers, and a new state distribution that is a probability distribution over possible states for each alternative maneuver of the finite plurality of alternative maneuvers, wherein:
    a probability of a selected maneuver in the new maneuver distribution is calculated as proportional to a sum, over all previous time step's maneuvers, of a product, for each previous time step's maneuver that is a possible maneuver of the target road user in a previous time step, of a first term that is a previously calculated probability of the previous time step's maneuver, a second term that is a probability of the selected maneuver in the new time step from a probability distribution over possible states for the previous time step's maneuver based on the behavioral model assigned to the target road user, and a third term that is a probability of the apparent state observed at the new time step calculated for the selected maneuver and the probability distribution over possible states for the previous time step's maneuver based on a set of motion parameters associated to the selected maneuver; and
    the new distribution over possible states for each alternative maneuver is calculated as the sum, over all previous time step's maneuvers, of the product, for each previous time step's maneuver, of at least a state distribution obtained by propagating the probability distribution of possible states for the previous time step's maneuver using the motion parameters associated to each alternative maneuver and a fourth term proportional to the product of the first, second and third terms;
    determining a risk of collision of the road vehicle with another road user of the plurality of road users, based on the new maneuver and state distributions of the target road user; and
    executing an avoidance action if the risk of collision exceeds a predetermined threshold.

2. The driving assistance method of claim 1, wherein the third term is calculated by applying a set of motion parameters associated to the selected maneuver to the probability distribution over possible states for the previous time step's maneuver so as to obtain a dynamics-based predicted probability distribution for the new time step which is then compared with the apparent state observed at the new time step.

3. The driving assistance method of claim 2, wherein the set of motion parameters associated to the selected maneuver is applied using at least a prediction step of an Extended Kalman Filter algorithm.

4. The driving assistance method of claim 1, wherein the behavioral model assigned to the target road user takes the form of a cost function for calculating a cost of a state of the target road user, with at least one dynamic component for taking into account a state of a road user other than the target road user, and the second term is calculated by:
- sampling a plurality of possible states from the probability distribution among possible states of the target road user for the previous time step's maneuver;
- propagating each possible state sampled for the target road user, over a plurality of subsequent time steps, according to the set of motion parameters associated to each maneuver of the finite plurality of alternative maneuvers, to obtain an alternative sequence of prospective states at the plurality of subsequent time steps for each possible state sampled for each maneuver of the finite plurality of alternative maneuvers and the target road user;
- sampling at least one possible state and maneuver, from a state and a maneuver distribution of at least a road user, of the plurality of road users, other than the target road user, for the previous time step;
- propagating the at least one possible state sampled for the at least one road user other than the target road user, according to a set of motion parameters associated to the at least one maneuver sampled for the at least one road user other than the target road user, to obtain at least one sequence of prospective states at the plurality of subsequent time steps for the at least one road user other than the target road user;
- estimating a cost of each prospective state of each alternative sequence of prospective states of the target road user, according to the behavioral model assigned to the target road user, taking into account the at least one prospective state of the at least one road user other than the target road user at the same subsequent time step;
- aggregating the costs of the prospective states of each alternative subsequent sequence of prospective states of the target road user to obtain an aggregated cost for each alternative subsequent sequence of prospective states of the target road user;
- averaging the aggregated costs of the alternative sequence of prospective states of the target road user for each maneuver of the finite plurality of alternative maneuvers to obtain an average aggregated cost of each maneuver of the finite plurality of alternative maneuvers; and
- subtracting from one the ratio of the average aggregated cost of the selected maneuver to the sum of the average aggregated costs of the finite plurality of alternative maneuvers.

5. The driving assistance method of claim 4, wherein the at least one dynamic component comprises one or more of a time-headway and a time-to-collision between the target road user and another road user of the plurality of road users.

6. The driving assistance method of claim 4, wherein, to assign a behavioral model to the target road user of the plurality of road users, an aggregated cost of successive observed states of the target road user is calculated for each behavioral model of a finite plurality of alternative behavioral models, and the behavioral model with the lowest aggregated cost is selected.

7. The driving assistance method of claim 1, wherein, to obtain a state distribution by propagating the probability distribution of possible states for each previous time step's maneuver when calculating the new distribution of possible states for each possible maneuver, the set of motion parameters associated to each possible maneuver is applied using an Extended Kalman Filter algorithm, wherein the apparent state of the target road user at the new time step is used in an updating step.

8. The driving assistance method according to claim 1, wherein the behavioral model assigned to the target road user is selected from among a finite plurality of behavioral models.

9. The driving assistance method of claim 8, wherein the finite plurality of behavioral models is learned from observed road user behavior using a machine learning algorithm.

10. The driving assistance method of claim 9, wherein the traffic scene comprises a multi-lane road, and the finite plurality of alternative maneuvers comprises a lane-keeping and a lane-changing maneuver.

11. A driving assistance system for a road vehicle, the driving assistance system comprising:
- a sensor set configured to observe a plurality of successive states for each road user of a plurality of road users in a traffic scene including the road vehicle among the plurality of road users;
- a data storage device for a database comprising a finite plurality of predetermined alternative maneuvers for the plurality of road users;
- a data processor, connected to the sensor set and the data storage device, configured to assign a behavioral model to a target road user of the plurality of road users and calculate, for the target road user, at a new time step, based on the apparent states that have been observed, a new maneuver distribution that is a probability distribution over a finite plurality of alternative maneuvers, and a new state distribution that is a probability distribution of possible states for each maneuver of the plurality of alternative maneuvers, wherein:
  - a probability of a selected maneuver in the new maneuver distribution is calculated as proportional to a sum, over all previous time step's maneuvers, of a product, for each previous time step's maneuver that is a possible maneuver of the target road user in the previous time step, of a first term that is a previously calculated probability of the previous time step's maneuver, a second term that is a probability of the selected maneuver in the new time step from a probability distribution of possible states for the previous time step's maneuver based on the behavioral model assigned to the target road user, and a third term that is a probability of the apparent state observed at the new time step calculated for the selected maneuver and the probability distribution of possible states for the previous time step's maneuver based on a set of motion parameters associated to the selected maneuver; and
  - the new distribution of possible states for each possible maneuver is calculated as the sum, over all previous time step's maneuvers, of the product, for each previous time step's maneuver, of a state distribution obtained by propagating the probability distribution of possible states for the previous time step's maneuver using the motion parameters associated to each alternative maneuver and a fourth term proportional to the product of the first, second and third terms;

determining a risk of collision of the road vehicle with another road user of the plurality of road users, based on the new maneuver and state distributions of the target road user; and executing an avoidance action if the risk of collision exceeds a predetermined threshold.

12. A road vehicle comprising a driving assistance system according to claim 11.

13. The driving assistance system for a road vehicle according to claim 11, wherein the sensor set comprises one or more of an inertial measurement unit, a satellite navigation receiver, a LIDAR, a radar, and a front camera.

14. The driving assistance system for a road vehicle according to claim 13, wherein the data processor comprises one or more of an obstacle tracker module, a lane tracker module, a localization module, an obstacle position and dynamics module, and a driver model assignment module.

15. The driving assistance system for a road vehicle according to claim 14, wherein the data storage device comprises one or more of a driver model database and a maneuver dynamics database.

* * * * *